United States Patent
Schulz et al.

(10) Patent No.: US 10,777,961 B2
(45) Date of Patent: Sep. 15, 2020

(54) GENERATING PLASMA OR LASER PULSES BY RADIOFREQUENCY EXCITATION PULSES

(71) Applicant: TRUMPF Laser—und Systemtechnik GmbH, Ditzingen (DE)

(72) Inventors: Robert Schulz, Böblingen (DE); Torsten Beck, Stuttgard (DE)

(73) Assignee: TRUMPF Laser—und Systemtechnik GmbH, Ditzingen (DE)

( * ) Notice: Subject to any disclaimer, the term of this patent is extended or adjusted under 35 U.S.C. 154(b) by 0 days.

(21) Appl. No.: 15/950,267

(22) Filed: Apr. 11, 2018

(65) Prior Publication Data
US 2018/0233876 A1    Aug. 16, 2018

Related U.S. Application Data

(63) Continuation of application No. PCT/EP2015/073511, filed on Oct. 12, 2015.

(51) Int. Cl.
*H01S 3/097*    (2006.01)
*H01S 3/134*    (2006.01)
(Continued)

(52) U.S. Cl.
CPC ........ *H01S 3/09702* (2013.01); *H01S 3/0971* (2013.01); *H01S 3/10038* (2013.01);
(Continued)

(58) Field of Classification Search
CPC ............. H01S 3/09702; H01S 3/2232; H01S 3/10038; H01S 3/0971; H01S 3/134; H01S 3/10046; H05H 1/46; H05H 2001/4682
See application file for complete search history.

(56) References Cited

U.S. PATENT DOCUMENTS 5,982,790 A * 11/1999 Grossman ............... H01S 3/13
372/10
6,459,067 B1 * 10/2002 Vona, Jr. ........... H01J 37/32082
219/121.43
(Continued)

FOREIGN PATENT DOCUMENTS

CN    1510802    7/2004
CN    101276983    10/2008
(Continued)

OTHER PUBLICATIONS

International Search Report and Written Opinion in International Application No. PCT/EP2015/073511, dated Jun. 20, 2016, 21 pages.
(Continued)

*Primary Examiner* — Xinning(Tom) Niu
(74) *Attorney, Agent, or Firm* — Fish & Richardson P.C.

(57) ABSTRACT

Methods, devices, and apparatus for generating plasma or laser pulses by radio frequency (RF) excitation pulses are provided. In one aspect, a method includes specifying radio frequency (RF) excitation pulses at least partially as a function of a preceding RF excitation of a medium and outputting a signal to a RF pulse generator, the signal configured to cause the RF pulse generator to generate the specified RF excitation pulses for exciting the medium to generate plasma or laser pulses. The RF excitation pulses is specified to become more strongly reduced in energy when a remaining excitation of the medium by the preceding RF excitation is higher.

20 Claims, 3 Drawing Sheets

(51) Int. Cl.
*H05H 1/46* (2006.01)
*H01S 3/10* (2006.01)
*H01S 3/0971* (2006.01)
*H01S 3/223* (2006.01)

(52) U.S. Cl.
CPC .......... *H01S 3/10046* (2013.01); *H01S 3/134* (2013.01); *H01S 3/2232* (2013.01); *H05H 1/46* (2013.01); *H05H 2001/4682* (2013.01)

(56) References Cited

U.S. PATENT DOCUMENTS

| | | |
|---|---|---|
| 8,687,661 B2 | 4/2014 | Rosenthal et al. |
| 2004/0238345 A1 | 12/2004 | Koulik et al. |
| 2006/0176917 A1 | 8/2006 | Grek et al. |
| 2012/0189031 A1* | 7/2012 | Fontanella .......... H01S 3/09705 372/55 |
| 2013/0272325 A1 | 10/2013 | Rosenthal et al. |

FOREIGN PATENT DOCUMENTS

| | | |
|---|---|---|
| CN | 104269730 | 1/2015 |
| DE | 112013002021 | 3/2015 |
| JP | 2014096445 | 5/2014 |
| JP | 2015032682 | 2/2015 |

OTHER PUBLICATIONS

CN Office Action in Chinse Appln. No. 201580083821.9, dated Apr. 25, 2019, 20 pages (with English translation).

* cited by examiner

GENERATING PLASMA OR LASER PULSES BY RADIOFREQUENCY EXCITATION PULSES

CROSS REFERENCE TO RELATED APPLICATIONS

This application is a continuation of and claims priority under 35 U.S.C. § 120 from PCT Application No. PCT/EP2015/073511 filed on Oct. 12, 2015, the contents of which is incorporated herein by reference in its entirety.

TECHNICAL FIELD

The invention relates to a method and to an apparatus for generating plasma or laser pulses by radiofrequency excitation pulses, in particular a gas discharge laser, where a medium is excited with radiofrequency excitation pulses to fulfil plasma or laser pulse specifications. The invention furthermore relates to a control unit for a radiofrequency excitation pulse generator and to a radiofrequency excitation pulse generator having such a control unit.

BACKGROUND

It is known that, during generation of laser pulses, a modification of a laser medium occurs, and this has for example an effect on the power of the laser pulses generated. That is to say, the same excitation pulses do not always lead to the same output laser pulses in the same laser beam generator.

One known measure of increasing the influence of a laser medium being modified on the reproducibility of an output laser pulse generated by a radiofrequency excitation pulse is so-called "simmering". In simmering, the laser medium is additionally excited by short simmer pulses between the excitation pulses that are used for generating a laser output pulse, where the excitation by the simmer pulses remains below the threshold of laser emission. The laser medium is thereby kept in a maximally constant state (close to the excitation threshold). For example, simmering is described in US 2012/189031 A1.

In DE 11 2013 002 021 T5, for a diffusion-cooled $CO_2$ gas discharge laser, it is explained that, in the case of two successive identical radiofrequency excitation pulse sequences, the second output laser pulse has a lower laser power than the first output laser pulse. The reason for this difference is, according to DE 11 2013 002 021 T5, the introduction of heat into the laser medium by the first excitation pulse sequence, as a result of which the efficiency of the second excitation pulse sequence is reduced. In order to compensate for this, empirical enhancement factors for the second RF excitation pulse sequence are stored. The enhancement factors vary as a function of the time which elapses between the end of the first excitation pulse sequence and the start of the second excitation pulse sequence. The enhancement factors always cause an increase in the power of the second excitation pulse sequence, this being brought about in various ways. For instance, the pulses of the second excitation pulse sequence may all be lengthened in time, or additional pulses may be added in comparison with the first excitation pulse sequence.

SUMMARY

One aspect of the invention features a method includes specifying radio frequency (RF) excitation pulses at least partially as a function of a preceding RF excitation of a medium and outputting a signal to a RF pulse generator, the signal configured to cause the RF pulse generator to generate the RF excitation pulses based on a specification of the RF excitation pulses. The medium can be excited by the generated RF excitation pulses to generate plasma or laser pulses. The specifying (or determination) of the radiofrequency excitation pulses is at least partially carried out in such a way that the radiofrequency excitation pulses become more strongly reduced in energy when a remaining excitation of the medium by the preceding radiofrequency excitation is higher.

The invention is based on the discovery that a reason for variations of the output pulse energy (sometimes also the output pulse power) of pulses generated by radiofrequency excitation is that there is already a relatively high excitation level in the medium because of preceding excitations, so that a pulse is generated more rapidly by the radiofrequency excitation pulses than in a medium which has not been excited, or has been excited to a lesser extent. The laser threshold for the pulse generation is exceeded earlier.

Thus, if radiofrequency excitation pulses of the same energy are applied on the one hand to an already excited medium and on the other hand to a medium which has scarcely been excited, in the case of application to the already excited medium a pulse is generated earlier and therefore in total for longer. Because of the longer pulse duration, a higher energy of the pulse is obtained. Depending on the remaining excitation state of the medium at the time of the start of the radiofrequency excitation pulse, a greater or lesser difference is therefore encountered between the pulse specification and the output pulse actually generated.

The invention solves this problem by a dynamic adaptation of the radiofrequency excitation pulses, which takes into account the remaining excitation of the medium at the time of a new pulse request or specification. Deviations of the pulses generated from the pulse specifications are reduced surprisingly effectively and in a simple way by a radiofrequency excitation pulse being reduced in energy to a differing amount as a function of the level of the remaining excitation of the medium.

In some implementations, this adaptation is carried out in a control unit (controller) of an excitation pulse generator of an apparatus for generating a plasma or laser pulse, in particular of a laser beam generator, continuously during the generation of the pulses that are generated on the basis of pulse requests or pulse specifications to the control unit.

In general, the generation of a (continuous) output pulse may also be carried out with a plurality of relatively short excitation pulses, the pauses between these excitation pulses being so short that the pulse emission in the medium is not interrupted between the excitation pulses, but is possibly only attenuated somewhat. In this case, an energy reduction according to the invention of the excitation pulse may occur, for example, in omission of individual pulses in the excitation pulse sequence and/or in shortening of individual excitation pulses in the pulse train.

As an alternative or in addition, the excitation pulses may also be reduced in energy by a modification of their power.

In one particularly exemplary embodiment of the invention, the radiofrequency excitation pulses are at least partially reduced in energy by shortening the radiofrequency excitation pulses, particularly with their start and/or end times being modified, the higher a remaining excitation of the medium by the preceding radiofrequency excitation is. This variant is distinguished by particularly simple and highly dynamic control technology implementation.

The invention can be used in a method in which the output pulses are respectively generated by a (continuous) excitation pulse.

In some implementations, the radiofrequency excitation pulse for generating a predetermined pulse thus begins later, or ends earlier, depending on the excitation state of the medium.

In particular, a pulse specification which includes two pulses of equal length leads to different radiofrequency excitation pulses as a function of the remaining excitation of the medium. The higher the remaining excitation is, the shorter the radiofrequency excitation pulse is. In general, the remaining excitation of the medium is dependent on the preceding excitation. The longer the period of time since the last radiofrequency excitation pulses is and the shorter these pulses were, the lower the remaining excitation of the medium is.

In some implementations, when establishing the excitation pulses on the basis of a pulse specification, a further adaptation/modification of the excitation pulses may also be carried out while taking one or more other effects into account. In such a variant, it is readily conceivable that the modification according to the invention, taking the residual excitation-dependent delay times into account, would lead to an energy reduction, in particular a shortening of excitation pulses, while based on taking other effects into account a lower or no energy reduction takes place overall, in particular no shortening, or even an energy increase, in particular a lengthening of these excitation pulses.

In the case of a particularly exemplary embodiment of the invention, a laser medium of a gas discharge laser is excited to generate laser pulses by the radiofrequency excitation pulses. Because of the processes upstream in the gaseous laser medium of the laser pulse emission, the delay times between the start of a radiofrequency excitation pulse and the start of the laser pulse thereby generated differs particularly significantly depending on how high the residual excitation of the medium by the preceding excitations is. This effect does occur also in solid-state lasers, but because of the much more rapid decay of residual excitations in the medium the effect does not have such a pronounced result, even in the case of highly dynamic pulse trains.

The dynamic determination, according to the invention, of the radiofrequency excitation pulses while taking the remaining excitation of the laser medium into account therefore has a particularly positive effect in gas discharge lasers on the accuracy with which a generated pulse matches the pulse specification.

This applies to an even greater extent in CO or $CO_2$ gas discharge lasers. For example, the processes upstream in the gas mixture of the $CO_2$ gas discharge laser, in particular the pumping of nitrogen into an excited state, etc., crucially influence the delay time of the pulse emission and furthermore vary greatly as a function of the remaining excitation. Thus, the proportion of nitrogen in the excited state is much higher in the case of a high remaining excitation.

The radiofrequency excitation pulses can lie in the range of 1-1000 MHz, particularly in the range of from 10 to 15 MHz. The modulation of the radiofrequency excitation pulses can be carried out by switching the electromagnetic field on and off.

In a particular example, the invention is used with pulses having a duration of from 0.5 to 50 µs is and pulse intervals of from 10 µs is to 25 ms. In the method according to the invention, pulse generation can be carried out according to a pulse specification in which the duration and the intervals of the pulses vary, i.e., not during operation in which only a constant repetition rate of the pulses is employed. In such applications, there is a particularly significant improvement by the dynamic control, according to the invention, of the radiofrequency excitation pulses.

For example, the boring of circuit boards by laser pulses, which are generated by a flow $CO_2$ gas discharge laser controlled according to the invention, represents a particularly application. In this application, varying pulse specifications with high dynamics (short pulse intervals) are to be satisfied with the least possible energy deviations.

In diffusion-cooled $CO_2$ gas discharge lasers, a heating effect is more strongly noticeable, which rather has an effect counter to the shortened delay time by residual excitation. For this reason, the invention may be used particularly effectively and simply in flow $CO_2$ gas discharge lasers, since in these laser types the aforementioned heating effect plays a secondary role.

For example, the invention is used advantageously in the pulsed operation of a long-flow $CO_2$ gas discharge laser "TruFlow" of the company TRUMPF®.

In one particularly exemplary embodiment, a measure of the delay time between the start of a radiofrequency excitation pulse and of the plasma or laser pulse thereby generated is used for determining the radiofrequency excitation pulses.

In what follows, a measure is intended to be a value which is in a close correlation with the quantity, or even quantitatively indicates the quantity itself directly. The measure of the delay time may, in this context, for example represent a specific period of time, or for example a parameter having a value from 0 to 1, where 0 stands for a delay time in a medium which is not residually excited and 1 stands for a delay time maximally shortened by pre-excitation.

By a measure of the modified delay time being used when establishing the radiofrequency excitation pulses, precisely that quantity which is primarily the cause of the variations is incorporated into the dynamic adaptation.

For the same reason, it is of further advantage if, in a particularly exemplary embodiment, the measure of the delay time is determined as a function of a measure of the remaining excitation of the medium. A measure of the remaining excitation of the medium may for example be in the form of a value between 0 and 1, where zero stands for no remaining excitation and 1 for maximum remaining excitation. The measure of the remaining excitation may also be processed in the form of an energy value, which may be used for the determination of the radiofrequency excitation pulses on the basis of a pulse specification.

In some embodiments, a stored calculation model is employed for determining the radiofrequency excitation pulses. By virtue of the use of a stored calculation model, in particular no additional measurement of state variables, for example of the laser medium, is necessary. Special sensors etc. are not required for carrying out the invention. The employment of a calculation model also makes it possible to use the invention in the case of variable, in particular highly dynamic, pulse sequences, since the computation times of a stored calculation model, which does not need to access continuously recorded measurement values, are shorter than those of a control loop in which continuously recorded measurement values are employed. It is particularly advantageous for the calculation model to employ values which are in any case present in the controller, for example the profiles of the pulse specifications and/or the profiles of the radiofrequency excitation pulses already carried out.

As already explained, differences in the delay times and the remaining excitation in the laser medium are causal quantities which give rise to energy deviations of the pulses generated, so that the stored calculation model can be configured to determine a measure of the remaining excitation of the medium and/or of the delay time between the start of a radiofrequency excitation pulse and of the plasma or laser pulse thereby generated.

In one particularly exemplary embodiment, the start and/or end times of the preceding radiofrequency excitation pulses are used for determining a measure of the remaining excitation of the medium. In a simple way, the history of the medium excitation may be taken into account on the basis of data present in any case in the controller.

In particular on the basis of start and/or end times of the preceding radiofrequency excitation pulses, a function of the excitation decay when no radiofrequency excitation takes place, and/or a function of the excitation variation during a radiofrequency excitation, may be used in a simple and with a speed sufficient for highly dynamic control for determining a measure of the remaining excitation of the medium. The function of the excitation decay and/or the function of the excitation variation can be determined empirically.

Because of the short pulse durations and pulse intervals in the applications, there is a great requirement for the speed of the control electronics. In one particularly exemplary embodiment, a programmable (logic) gate array (field programmable gate array (FPGA)) is therefore used for determining the radiofrequency excitation pulses.

In one particularly exemplary embodiment, between radiofrequency excitation pulses for generating plasma or laser pulses, the medium is additionally excited with radiofrequency excitation pulses by which the medium is not, however, excited into laser emission (simmer pulses).

By virtue of the establishment, according to the invention, of the radiofrequency excitation pulses while taking the remaining excitation of the medium by preceding radiofrequency excitations into account, in the case of a $CO_2$ gas discharge laser it is possible to generate pulses with pulse durations of from 0.5 to 50 µs and pulse intervals from 10 µs to 25 ms, in which the deviations of the pulse energy relative to the pulse specification can be at least halved in comparison with control without the residual excitation-dependent adaptation.

In one particularly exemplary embodiment, a calibration process is carried out, in which parameters are determined that are used by the stored calculation model. A method is obtained which can react even more flexibly and in an even more optimized way to varying influences.

Another aspect of the invention features a control unit (or a controller) for an excitation frequency generator for an apparatus for generating plasma or laser pulses by radiofrequency excitation pulses, which is suitable for carrying out a method according to the invention, in particular a control unit which operates according to the method according to the invention to generate plasma or laser pulses by means of radiofrequency excitation pulses.

As already explained, it is particularly for this apparatus to be configured as a gas discharge laser, for example as a CO or $CO_2$ gas discharge laser and/or as a fast-flow gas discharge laser.

Further aspects of the invention relate to the excitation frequency generator having such a control unit, and to the apparatus for generating plasma or laser pulses, having an excitation frequency generator.

The invention may be employed to improve the generation of plasma or laser pulses by radiofrequency excitation pulses, in such a way that the pulses generated can more precisely and more reproducibly follow pulse specifications, in particular varying pulse specifications.

Further configurations of the invention are the subject-matter of the dependent claims and of the exemplary embodiments of the invention which are described below. The invention will be explained in more detail below with the aid of exemplary embodiments with reference to the appended figures.

DETAILED DESCRIPTION

Figure 1:
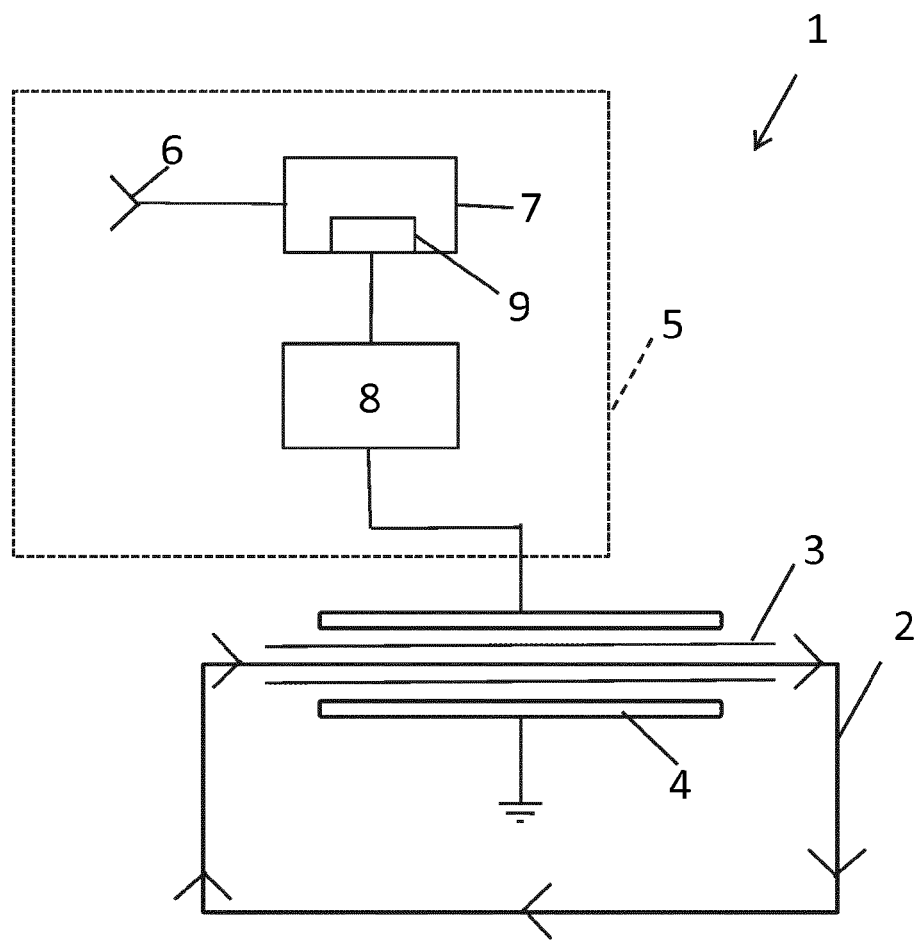
FIG. 1 shows a schematic representation of an apparatus for generating laser pulses by radiofrequency excitation pulses, in the form of a flow $CO_2$ gas discharge laser, including the associated control unit.

FIG. 1 shows an apparatus 1 for generating plasma or laser pulses by radiofrequency excitation pulses, which is configured as a flow $CO_2$ gas discharge laser. A gaseous laser medium 2 circulates through a resonant cavity 3, in which the laser medium 2 can be excited to emit laser pulses by radiofrequency excitation electrodes 4. The laser medium 2 includes essentially carbon dioxide, nitrogen and helium, for example in the mixing ratio 5.5:29:65.5. The resonant cavity 3 is bounded by two mirrors (not shown) (back mirror and output mirror).

The laser pulses have, for example, a wavelength of 10.6 µm. Laser pulses may be generated with a pulse duration of from 0.5 to 50 µs is and pulse intervals of from 10 µs is to 25 ms. The radiofrequency excitation pulses lie at frequencies in the MHz range, in particular at frequencies of from 10 to 15 MHz. The modulation of the radiofrequency excitation pulses is carried out by switching the electromagnetic field on and off.

An excitation pulse generator 5 of the $CO_2$ gas discharge laser 1 has a control unit (or controller), which inter alia includes an input port 6 for pulse specifications and an excitation pulse determiner 7. The input port 6 receives pulse specifications, for example from a unit (not shown) that runs a numerical processing program, and forwards these pulse specifications to the excitation pulse determiner 7. In the excitation pulse determiner 7, on the basis of the pulse specifications, radiofrequency excitation pulses are established, by which laser pulses are generated according to the pulse specification. Part of the excitation pulse determiner 7 is a highly dynamic adaptation module 9, which adapts or modifies the radiofrequency excitation pulses as a function of a remaining excitation of the laser medium.

In one example, the highly dynamic adaptation module 9 is configured in the form of a programmable (logic) gate array (e.g., FPGA). It may, however, also be configured as an integral part of a microprocessor of the excitation pulse determiner 7. Further alternatives for control-technology implementation include a CPLD (complex programmable logic device) or of any other type of logic elements.

The excitation pulses defined (or specified) by the excitation pulse determiner 7 are delivered to the excitation pulse generator 8, which outputs corresponding excitation pulses to the excitation electrodes 4. By the excitation pulses acting on the laser medium 2 in the resonant cavity 3, laser pulses are finally generated. The laser pulses generated may, for example, be delivered by beam guiding components (not shown) to a laser processing head for processing a workpiece.

Figure 2:
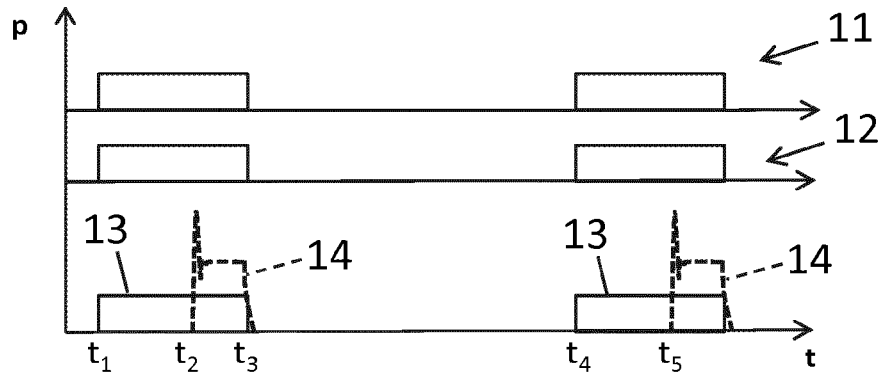
FIGS. 2 to 4 show diagrams which show a pulse specification, a resulting specification to the radiofrequency generator, as well as the radiofrequency excitation pulses and the laser pulses thereby generated.
Figure 3:
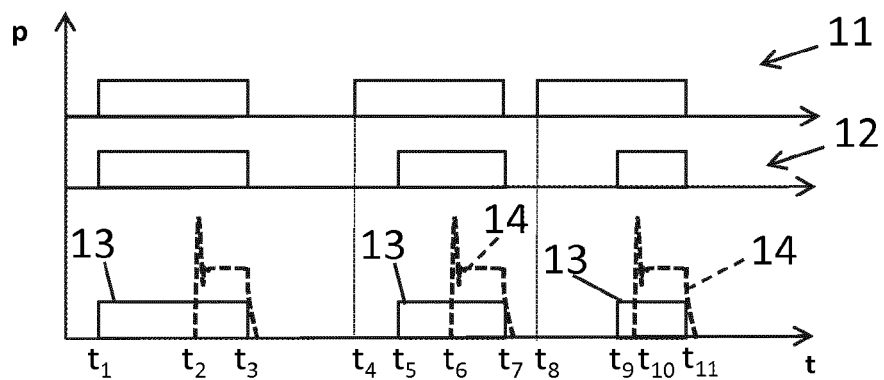
Figure 4:
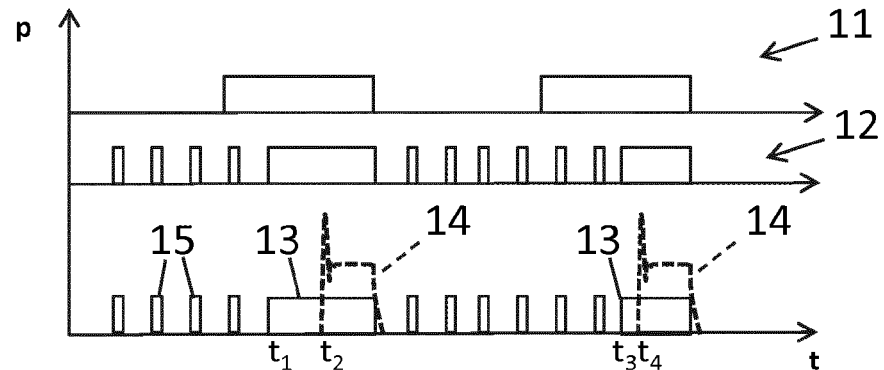

The method for generating laser pulses while taking the state of the laser medium 2 into account, with the aid of various pulse trains which are shown in FIGS. 2 to 4, will be explained below. FIGS. 2 to 4 respectively represent at the top a pulse specification 11 arriving at the input port 6. Represented underneath are the excitation pulse specifications 12 which the excitation pulse determiner 7 establishes on the basis of the pulse specification 11 and forwards to the excitation pulse generator 8. The radiofrequency excitation pulses 13 and the laser pulses 14 thereby generated are shown in the respective bottom diagram. It should be mentioned that the timescales of the diagrams differ significantly from one another between the various FIGS. 2 to 4.

FIG. 2 shows a simple pulse train with two equally long laser pulses 14. It can be seen clearly that a delay time $t_v$ elapses between the start $t_1$, $t_4$ of the respective excitation pulses 13 and the start $t_2$, $t_5$ of the laser pulse 14 thereby generated. The reason for this delay time $t_v$ resides in processes in the laser medium 2 before laser emission takes place. In particular, the nitrogen must be excited first, and the energy must be transferred from the excited nitrogen by collision to the carbon dioxide, before the carbon dioxide then emits the excitation energy by laser emission. At the start, in a known fashion, the laser pulses 14 have a power spike. The power spike is followed by a period of time with relatively constant power of the laser pulse 14, until the laser pulse 14 decays relatively soon after the associated excitation pulse 13 is switched off.

In the exemplary case according to FIG. 2, the delay time $t_v$ for the first laser pulse 14 ($t_v=t_2-t_1$) is of equal length to the delay time $t_v$ for the second laser pulse 14 ($t_v=t_5-t_4$). This is, in particular, because a relatively long time (for example a few ms) has elapsed between the end $t_3$ of the first excitation pulse 13 and the start $t_4$ of the second excitation pulse 13 for generating the second laser pulse 14. Within this period of time excitation by the first excitation pulse 13 remaining in the laser medium 2 has substantially decayed. For this pulse train, no adaptation of the radiofrequency excitation pulses 13 is carried out by the adaptation module 9.

FIG. 3 in turn represents an example of a pulse train in which shortening of the radiofrequency excitation pulses 13 is carried out as a function of the remaining excitation of the laser medium 2 by the preceding radiofrequency excitation pulses 13.

The pulse specification 11 includes three pulses, which are respectively equally long and follow relatively soon after one another. The excitation pulse determiner 7 determines therefrom a specification for three differently long radiofrequency excitation pulses 13. The first radiofrequency excitation pulse 13 is the longest, as at its start there is no longer any excitation of the laser medium 2 by preceding excitation pulses 13. The first laser pulse 14 starts with a delay time $t_v=t_2-t_1$.

The second excitation pulse 13 is somewhat shorter than the first excitation pulse 13, since the laser medium 2 is still excited by the first excitation pulse 13 at the start of the second excitation pulse 13, and the delay time $t_v=t_6-t_5$ between the start $t_5$ of the second excitation pulse 13 and the start $t_6$ of the second laser pulse 14 is thus shorter than in the case of the first laser pulse 14.

The third excitation pulse 13 is the shortest, since the laser medium 2 has even more residual excitation at the start of the third excitation pulse 13 than at the start of the second excitation pulse 13. This is on the one hand because of the shorter period of time between the end $t_7$ of the second excitation pulse 13 and the start $t_9$ of the third excitation pulse 13, but also because of the remaining excitation by the first excitation pulse 13 as well. Because of the higher degree of remaining excitation, the delay time $t_v=t_{10}-t_9$ for the third laser pulse 14 is shortened further relative to the delay time $t_v=t_6-t_5$. The excitation pulse determiner 7 takes these circumstances into account, and adapts the length of the excitation pulses 13 accordingly. In the example shown, this is done by the second and third excitation pulses 13 starting later than would be indicated by the pulse specification 11. The second excitation pulse 13 starts later by an adaptation time $t_a=t_5-t_4$. The third adaptation pulse 13 starts later by an adaptation time $t_a=t_9-t_8$.

It can be seen from FIG. 3 that, by virtue of the dynamic adaptation, all three laser pulses 14 generated, as required in the pulse specification 11, are equally long and the same laser energy per laser pulse 14 is therefore also generated. Although the laser energy or duration has a difference relative to the energy or duration specified by the pulse specification 11, since this difference is constant for all three laser pulses 14 it can be taken into account beforehand when creating the pulse specification 11. As an alternative, in a modified mode, the excitation pulse determiner 7 may lengthen the excitation pulses 13 by the constant difference.

In the example according to FIG. 2, all three laser pulses 14 furthermore start with the same time offset relative to the pulse specification ($t_2-t_1=t_6-t_4=t_{10}-t_8$). This adaptation mode is of particular advantage for certain highly dynamic applications.

As an alternative, however, it is also possible for the excitation pulse determiner 7 to adapt the excitation pulses 13 in such a way that the excitation pulses 13 start as soon as possible, and the laser pulses 14 are therefore generated as soon as possible, but the excitation pulses 13 are ended earlier depending on the remaining excitation state of the laser medium, to generate the laser pulses 14 respectively with a laser power which is provided at least with a constant difference relative to the pulse specification 11.

In one particularly example, selection may be carried out between the various operating modes of the excitation pulse determiner 7, depending on what is most advantageous for the respective processing task.

Lastly, FIG. 4 shows an example in which, in addition to the excitation pulses 13 by which laser pulses 14 are generated, so-called simmer pulses 15 are also output to the excitation pulse generator 8 by the excitation pulse determiner 7. The simmer pulses 15 are short enough, and the spacing between them is long enough, so that they do not generate a laser pulse 14. They do, however, lead to a relatively constant excitation level in the laser medium 2, so that the differences in the delay times $t_v$ become smaller. Nevertheless, the dynamic adaptation of the excitation pulses 13 while taking the remaining excitation of the laser medium 2 into account does lead to an improvement. Thus, it can be seen from FIG. 4 that the delay time $t_v$ of the second laser pulse 14 is somewhat shorter despite the simmer pulses 15 than that of the first laser pulse 14 ($t_2-t_1>t_4-t_3$). This is taken into account by the excitation pulse determiner 7, and the second excitation pulse 13 is correspondingly shortened by its beginning later than without the dynamic adaptation.

With the aid of FIGS. 2 to 4, it has been seen that, by the excitation pulse determiner 7, determination of the radiofrequency excitation pulses 13 is carried out at least partially in such a way that the radiofrequency excitation pulses 13 are shortened more strongly by modifying their start and/or end times when a remaining excitation of the medium 2 by the preceding radiofrequency excitation is higher.

In addition or as an alternative to operation according to the examples shown, with the $CO_2$ gas discharge laser 1 generation of a (continuous) laser pulse may also be carried out by a plurality of shorter excitation pulses. As already mentioned in the introduction, the pauses between these excitation pulses are so short that the laser emission in the medium is not interrupted between the excitation pulses, but is possibly only attenuated somewhat. In this operating mode, the residual excitation-dependent adaptation of the excitation pulses by the excitation pulse determiner 7 may also be carried out by omitting individual pulses in the excitation pulse sequences.

The calculation processes in the excitation pulse determiner 7, particularly in the adaptation module 9 of the excitation pulse determiner 7, will be explained in more detail below with the aid of FIGS. 5 to 7.

Figure 5:
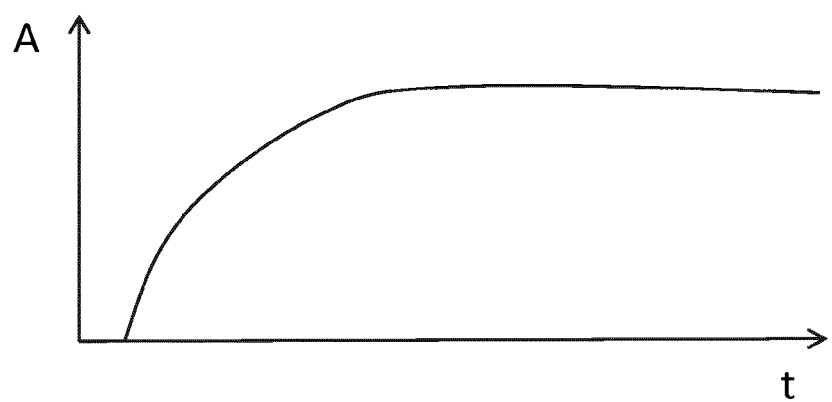
FIGS. 5 to 7 show stored functions which an adaptation module uses for adapting the radiofrequency excitation pulses.

FIG. 5 shows a profile of a measure of the excitation of the laser medium 2 as a function of the time for which an excitation pulse 13 acts on the medium. FIG. 6 shows a profile of the measure of the excitation of the laser medium 2 as a function of time when no excitation pulse 13 is acting on the laser medium 2. Lastly, FIG. 7 shows the profile of the delay time $t_v$ as a function of the measure of the remaining excitation of the laser medium 2 according to FIGS. 5 and 6. These three functions are stored in the adaptation module 9. They are, for example, determined on the basis of test measurements with various pulse trains. The measure of the excitation of the laser medium 2 may be used in the form of a specific energy value, but also as a dimensionless parameter. The measure of the delay time may likewise be calculated as a specific time value, but also as a dimensionless parameter.

Optionally, the functions may also be determined in the scope of a calibration process of the laser beam generator.

The adaptation module 9 operates as follows on the basis of the profiles according to FIGS. 5 to 7. Whenever an excitation pulse 13 is switched on or off, the current excitation level of the laser medium 2 is determined. The module 9 accesses the value of the excitation calculated last, and determines the modification of the excitation level with the aid of the profiles from FIGS. 5 and 6.

When an excitation pulse 13 is switched off, the variation of the excitation level is calculated with the aid of the profile of FIG. 5 and the duration of the excitation pulse 13 (=end time−start time), since it is assumed that the excitation has varied according to the stored profile during the excitation pulse 13 that has just ended.

Figure 6:
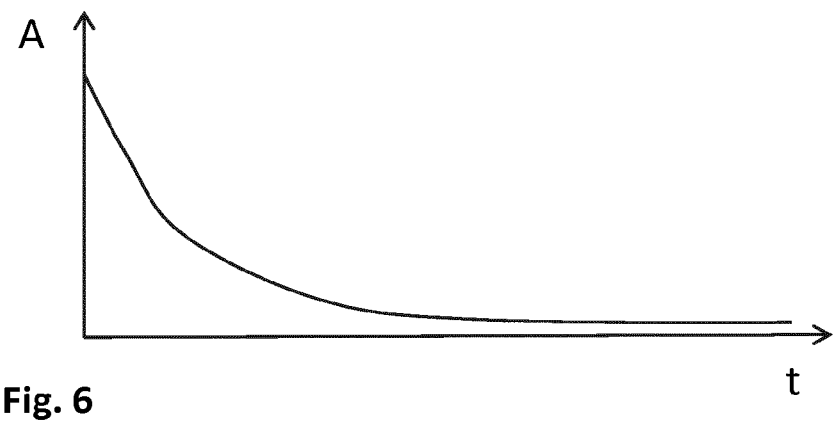
Figure 7:
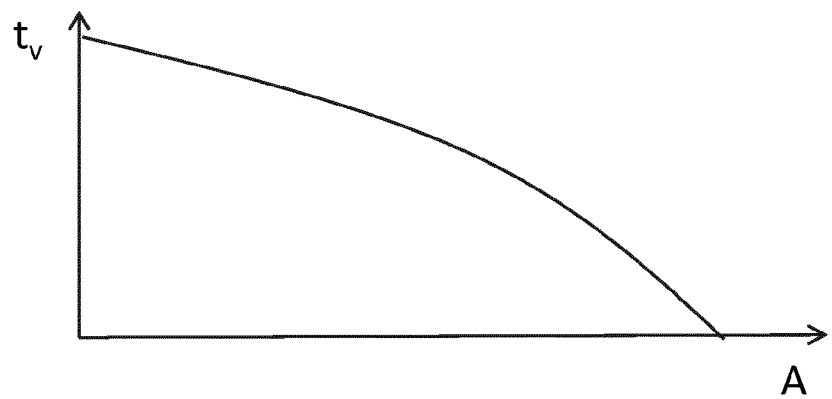

When an excitation pulse 13 is switched on, the determination of the excitation state is carried out with the aid of the function according to FIG. 6, since it is assumed that the excitation decays according to FIG. 6 during the excitation pulse-free period of time. On the basis of this calculation model, the state of the laser medium 2 is calculated continuously. This is done in a particularly simple way merely by means of stored functions and employing the on and off switching times of the excitation pulses 13. Since the last calculated excitation state is respectively used as a basis, not only is the directly preceding excitation pulse 13 or not only the switch-off time since the last excitation pulse 13 incorporated into the calculation, but also earlier excitation pulses 13. A history of the excitation pulses 13 is taken into account, by means of which a highly dynamic adaptation is possible. The adaptation of the excitation pulses 13 is finally carried out as follows.

At the start time of a pulse in a pulse specification 11 (for example time $t_4$ in FIG. 2), the adaptation module 9 determines the current state of the medium 2 with the aid of the profile of FIG. 6 on the basis of the excitation state which was determined at the switch-off time of the last excitation pulse 13. With the value determined in this way for the measure of the excitation state, an estimate of the excitation-dependent delay time $t_v$ is obtained from the profile according to FIG. 7. With the aid of the delay time $t_v$ determined, the adaptation time $t_a$ is then calculated and the excitation pulse 13 is started correspondingly later.

In alternative operating modes—as noted above—the excitation pulses 13 may be modified on the basis of the functions in a different way, for example ended earlier as a function of the excitation state.

Numerous modifications of the control-technology implementation of the invention may be envisioned. The explanations above merely describe an exemplary implementation. The diagrams represented are not true to scale. In particular, effects shown are sometimes represented exaggeratedly for better illustration.

What is claimed is:

1. An apparatus for generating plasma or laser pulses by radio frequency (RF) excitation pulses, the apparatus comprising:
a RF excitation pulse generator comprising:
a RF pulse generator; and
a controller coupled to the RF pulse generator and including at least one processor and a non-transitory computer-readable storage medium coupled to the at least one processor and storing programming instructions for execution by the at least one processor, the programming instructions instruct the at least one processor to:
specify radio frequency (RF) excitation pulses at least partially as a function of elapsed time from a preceding RF excitation of a medium, the RF excitation pulses capable of exciting the medium into plasma or laser pulse emission, the RF excitation pulses specified to become more strongly reduced in energy when a remaining excitation of the medium by the preceding RF excitation is higher; and
output a signal to the RF pulse generator, the signal configured to cause the RF pulse generator to generate the specified RF excitation pulses for exciting the medium to generate plasma or laser pulses.

2. The apparatus of claim 1, wherein the controller comprises an adaptor configured to adapt the specified RF excitation pulses based on the remaining excitation of the medium.

3. The apparatus of claim 1, further comprising:
excitation electrodes for receiving the generated RF excitation pulses; and
a resonator cavity within which the medium is,
wherein, in operation, the medium is excited by the RF excitation pulses applied on the excitation electrodes to generate plasma or laser pulses.

4. The apparatus of claim 1, configured to be a gas discharge laser, wherein the gas discharge laser is a CO or $CO_2$ gas discharge laser or a flow gas discharge laser.

5. A controller of a radio frequency (RF) excitation pulse generator for generating plasma or laser pulses by RF excitation pulses, the controller comprising:
- at least one processor; and
- a non-transitory computer-readable storage medium coupled to the at least one processor and storing programming instructions for execution by the at least one processor, the programming instructions instruct the at least one processor to:
  - specify radio frequency (RF) excitation pulses configured to generate laser pulses at least partially as a function of elapsed time from a preceding RF excitation of a medium, the RF excitation pulses capable of exciting the medium into plasma or laser pulse emission, the RF excitation pulses specified to become more strongly reduced in energy when a remaining excitation of the medium by the preceding RF excitation is higher; and
  - output a signal to a RF pulse generator, the signal configured to cause the RF pulse generator to generate the specified RF excitation pulses for exciting the medium to generate plasma or laser pulses.

6. A method of generating plasma or laser pulses, the method comprising:
- specifying radio frequency (RF) excitation pulses configured to generate laser pulses at least partially as a function of elapsed time from a preceding RF excitation of a medium, the RF excitation pulses capable of exciting the medium into plasma or laser pulse emission, the RF excitation pulses specified to become more strongly reduced in energy when a remaining excitation of the medium by the preceding RF excitation is higher; and
- outputting a signal to a RF pulse generator, the signal configured to cause the RF pulse generator to generate the specified RF excitation pulses for exciting the medium to generate plasma or laser pulses.

7. The method of claim 6, wherein the RF excitation pulses are at least partially reduced in energy by shortening the RF excitation pulses.

8. The method of claim 7, wherein shortening the RF excitation pulses comprises:
- modifying at least one of start times or end times of the RF excitation pulses.

9. The method of claim 6, further comprising:
- delivering the generated RC excitation pulse to a laser medium of a gas discharge laser.

10. The method of claim 9, wherein the gas discharge laser comprises one of a CO or $CO_2$ gas discharge laser and a flow gas discharge laser.

11. The method of claim 6, further comprising:
- determining a measure of a delay time between a start of a RF excitation pulse and a start of a plasma or laser pulse thereby generated,
- wherein specifying the RF excitation pulses comprises using the determined measure of the delay time.

12. The method of claim 11, wherein determining the measure of the delay time comprises:
- determining the measure of the delay time based on a measure of the remaining excitation of the medium.

13. The method of claim 6, further comprising:
- utilizing a stored calculation model to specify the RF excitation pulses.

14. The method of claim 13, wherein the stored calculation model is utilized to determine at least one of
- a measure of the remaining excitation of the medium or
- a measure of a delay time between a start of a RF excitation pulse and a start of a plasma or laser pulse thereby generated.

15. The method of claim 13, further comprising:
- carrying out a calibration process to determine one or more parameters for establishing the stored calculation model.

16. The method of claim 6, further comprising:
- determining a measure of the remaining excitation of the medium by using at least a start time and an end time of a pulse of the preceding RF excitation.

17. The method of claim 6, further comprising:
- determining a measure of the remaining excitation of the medium by using a function of an excitation variation when no RF excitation occurs.

18. The method of claim 6, further comprising:
- determining a measure of the remaining excitation of the medium by using a function of an excitation variation during a RF excitation.

19. The method of claim 6, further comprising:
- adapting the specified RF excitation pulses by using a programmable logic gate array.

20. The method of claim 6, wherein the specified RF excitation pulses comprises particular RF pulses between adjacent RF excitation pulses for generating the plasma or laser pulses, and the particular RF pulses is incapable of exciting the medium into plasma or laser pulse emission, and
- wherein the medium is additionally excited with the particular RF pulses during generating the plasma or laser pulses with the RF excitation pulses.

* * * * *